United States Patent

[11] 3,627,411

| [72] | Inventor | Erich Nagel Anzing, Germany |
|---|---|---|
| [21] | Appl. No. | 793,459 |
| [22] | Filed | Jan. 23, 1969 |
| [45] | Patented | Dec. 14, 1971 |
| [73] | Assignee | Agfa-Gevaert Aktiengesellschaft Leverkusen, Germany |
| [32] | Priority | Jan. 31, 1968 |
| [33] | | Germany |
| [31] | | P 16 22 168.4 |

[54] PHOTOGRAPHIC PRINTING APPARATUS
15 Claims, 3 Drawing Figs.

[52] U.S. Cl. .................................................. 355/45,
353/95, 353/97, 355/72, 355/74, 355/75
[51] Int. Cl. .................................................. G03b 27/62
[50] Field of Search ......................................... 355/40, 25,
45, 74, 72, 43, 18, 45, 44; 353/95, 97

[56] References Cited
UNITED STATES PATENTS

| 1,880,596 | 10/1932 | Tuttle ........................ | 355/45 |
| 2,305,782 | 12/1942 | Herrmann .................. | 355/40 |
| 3,089,384 | 5/1963 | Baasner ...................... | 355/74 |
| 3,137,573 | 6/1964 | Billet .......................... | 355/40 |
| 3,484,165 | 12/1967 | Denner ....................... | 353/97 |
| 3,511,565 | 5/1970 | Harman, Jr. et al. ........ | 355/75 |

Primary Examiner—Joseph F. Peters, Jr.
Assistant Examiner—Richard A. Wintercorn
Attorney—Michael S. Striker ABSTRACT: A photographic printing apparatus wherein the light-transmitting window at the printing station is defined by several masks which are movable with reference to each other to adjust the size of the window in dependency on the format of frames in the roll film which is being copied. The movements of masks are synchronized and one of the masks adjusts the reflector of a previewing device which permits visual inspection of one or more frames immediately ahead of the printing station.

INVENTOR.
ERICH NAGEL

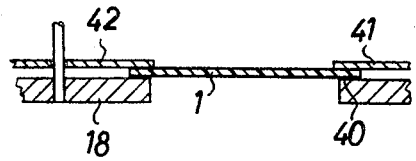
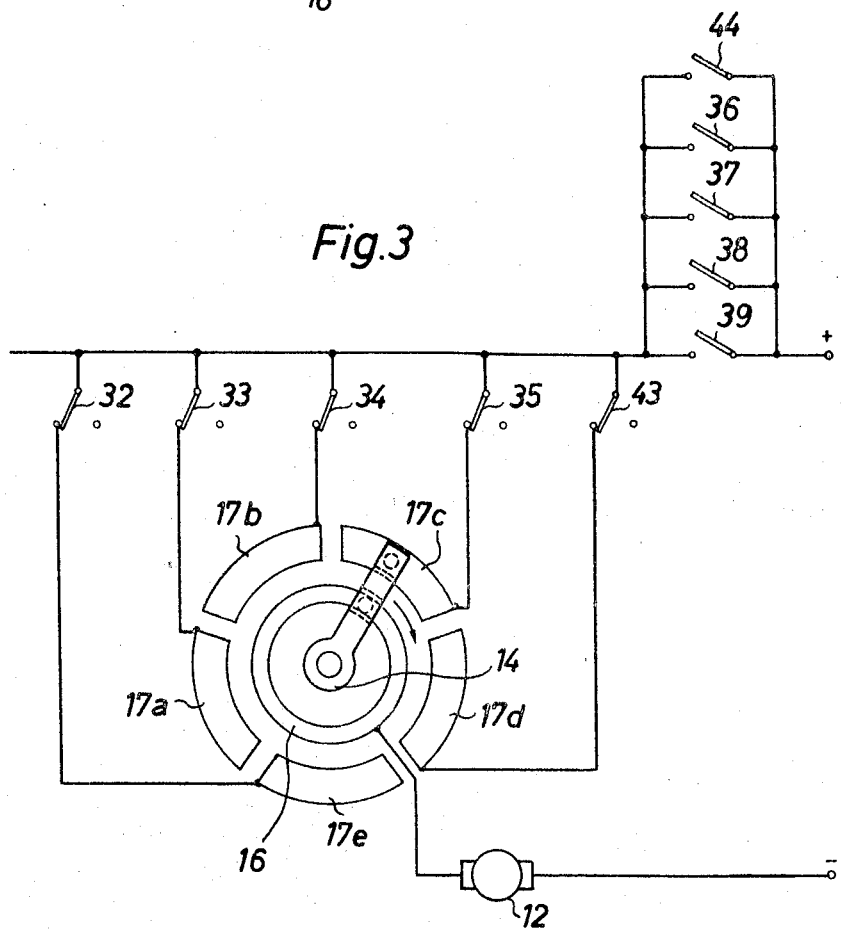

PHOTOGRAPHIC PRINTING APPARATUS

BACKGROUND OF THE INVENTION

The present invention relates to photographic printing or copying apparatus in general, and more particularly to improvements in means for confining the printing light in such apparatus. Still more particularly, the invention relates to improvements in photographic printing apparatus which are designed to make reproductions of images of successive frames on strips of exposed photographic roll film.

In presently known printing apparatus for reproduction of images on frames of roll film, a different set of masks must be used at the printing station whenever the format of film frames is changed. The masks are designed to confine printing light so that such light can penetrate only through a selected part of that frame which is located at the printing station. Thus, if a first strip with frames of a first size is followed by a second strip having frames of greater or smaller size, the masks at the printing station must be replaced by a different set of masks in order to insure that printing light will penetrate the film within an accurately determined area. The intervals required for replacement of masks in such conventional apparatus are normally utilized to effect appropriate adjustments in the feed of printing paper, in the rate of enlargement, and/or in operation of automatic exposure control. Nevertheless, it is often cumbersome to replace the masks at frequent intervals as well as to maintain a supply of different masks so as to make sure that the printing apparatus can be used for making copies from different types of roll film.

SUMMARY OF THE INVENTION

An object of the present invention is to provide a printing apparatus wherein the conversion from copying of one type of film to copying of one or more different types of film consumes little time and wherein a single set of masks suffices to insure proper confinement of printing light at the printing station regardless of the dimensions of frames in the film which is being copied.

Another object of the invention is to provide a printing apparatus wherein at least one film frame can be viewed prior to reaching the printing station, wherein the masks are readily accessible for the purpose of inspection and/or cleaning, and wherein the positions of masks can be readily determined by the person in charge.

A further object of the invention is to provide the printing apparatus with novel means for changing the size of the window for passage of printing light.

The invention is embodied in an apparatus for reproducing images of exposed frames on strips of photographic film wherein successive film frames are moved to and beyond a printing station. The apparatus comprises rails or analogous guide means defining a path for lengthwise movement of film strips, masking means provided at the printing station and defining a light-transmitting window of variable area for the passage of printing light, the masking means comprising two masking members extending transversely of the film path and movable with reference to each other in the longitudinal direction of such path, and adjusting means for moving the masking members. Such adjusting means preferably comprises cam and follower means arranged to move the masking members in synchronism so that each displacement of one masking member results in a predetermined displacement of the other masking member. The masking means may include a third masking member which is movable by the adjusting means in directions at right angles to the longitudinal direction of the film path and which flanks one marginal portion of the film at the printing station.

The novel features which are considered as characteristic of the invention are set forth in particular in the appended claims. The improved printing apparatus itself, however, both as to its construction and its mode of operation, together with additional features and advantages thereof, will be best understood upon perusal of the following detailed description of a specific embodiment with reference to the accompanying drawing.

BRIEF DESCRIPTION OF THE DRAWING

FIG. 2 is a transverse vertical sectional view as seen in the direction of arrows from the line II—II of FIG. 1, and FIG. 3 is a diagram of the electric circuit for the motor which drives the adjusting cam in the apparatus of FIG. 1.

DESCRIPTION OF THE PREFERRED EMBODIMENTS

Figure 1:
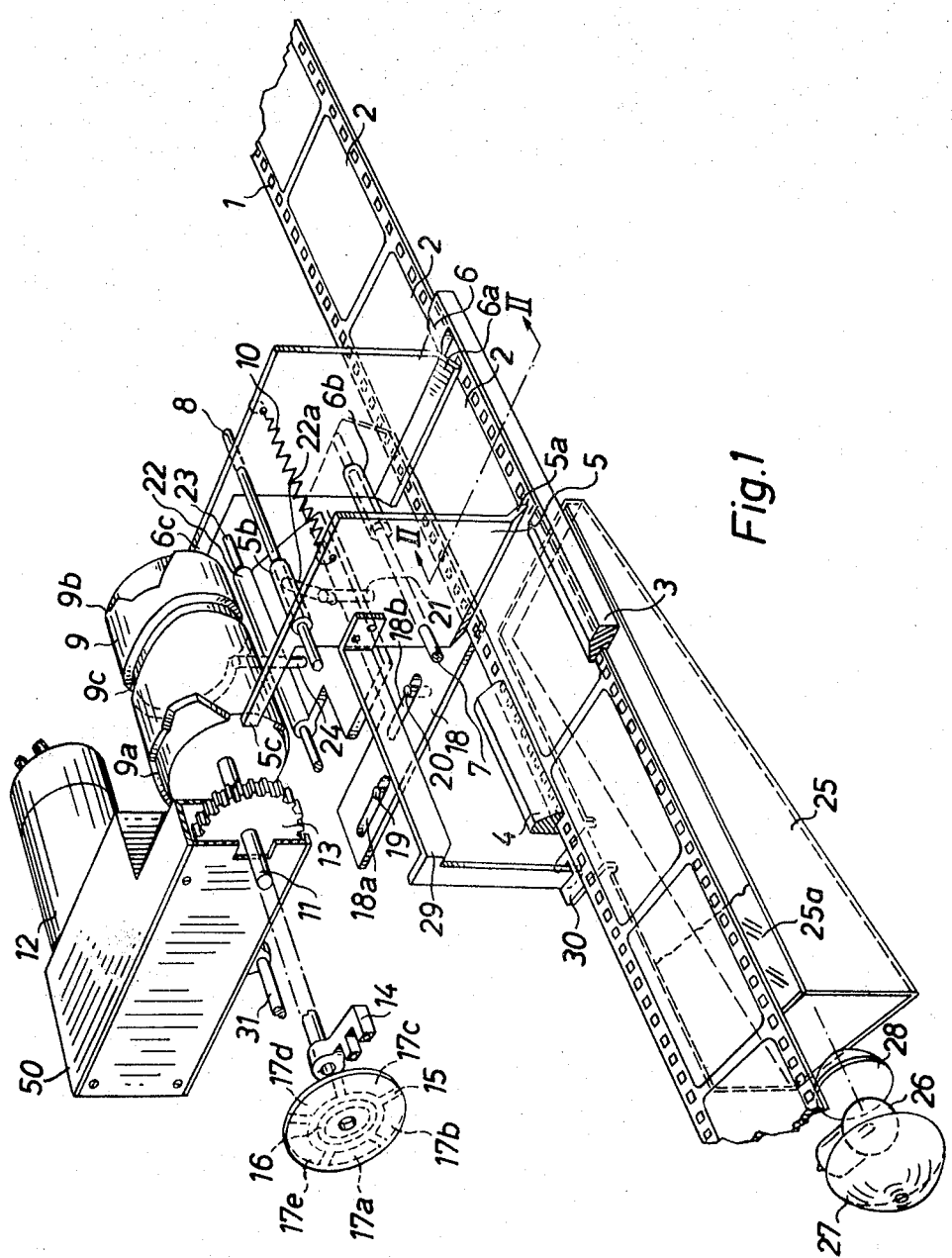
FIG. 1 is a perspective view of a portion of a printing apparatus which embodies the invention.

Referring first to FIG. 1, there is shown a strip 1 of exposed photographic roll film which includes a succession of frames or negatives 2. If desired, the marginal portions of the strip 1 can be provided with notches or analogous positioning marks which are tracked by an automatic scanning mechanism to properly position successive frames 2 during exposure to printing light. At the printing station, the marginal portions of the strip 1 are guided in channels defined by two guide rails 3, 4 each of which is preferably detachable to facilitate cleaning. For example, the rails 3, 4 can be held in requisite position by permanent magnets or the like. These rails define an elongated path for the strip 1, and such path is preferably located in a horizontal plane.

The printing station further accommodates two masking members or masks 5, 6 which are adjustable toward and away from each other in the longitudinal direction of the strip 1 (i.e., in the longitudinal direction of the path defined by guide rails 3, 4) to establish two boundaries for that portion of the image which is to be copied on a photosensitive sheet. The masking members 5 and 6 preferably consist of thin metallic sheet stock and their main portions are disposed in planes which are normal to the plane of the strip 1 at the printing station and normal to the direction of film travel. The inner sides of the masking members 5, 6 are coated with black lacquer and their lower marginal portions 5a, 6a are provided with rounded edges and are bent toward each other so that each marginal portion makes an obtuse angle with the main portion of the respective masking member. The rounded edges reduce the likelihood of scratching or other damage to the strip 1. The rear and front portions of the image which is to be reproduced are delineated by the utilization of so-called masking bands, not shown.

The masking members 5, 6 are provided with tubular portions or sleeves 5b, 6b which are slidable along guide rods 8, 7 mounted in a tiltable carrier structure 50 of the printing apparatus. The rods 7, 8 are parallel with the direction of travel of the strip 1 through the printing station. The adjusting means for moving the masking members 5, 6 along the guide rods 8, 7 comprises followers 5c, 6c in the form of arms which extend into suitably configurated circumferential grooves 9a, 9b of a cylindrical adjusting cam 9. A helical spring 10 is connected between the masking members 5, 6 to insure that the followers 5c, 6c invariably track the faces which flank the respective cam grooves. The cam 9 is mounted on a drive shaft 11 which is rotated by an electric motor 12 by way of a gear transmission 13.

The drive shaft 11 carries a U-shaped rotary sliding contact 14 which can travel along stationary contacts 16 and 17a–17e of a commutator disk 15. The stationary contacts 16 and 17a–17 form two concentric annuli whereby the contacts 17a, 17b, 17c, 17d, 17e of the outer annulus surrounded a single uninterrupted inner annulus which constitutes the contact 16. The contacts 17a–17e are insulated from each other.

The aforementioned guide rails 3 and 4 are provided with cutouts which are located at the printing station. The cutout of the outer rail 3 accommodates two masking elements including a fixed lower element 40 and an upper element 41 which latter can be swung upwardly by the adjusting means for the masking members 5, 6. These masking elements are shown in FIG. 2. The latter illustration further shows a third masking member including two sections 18, 42 which can accommodate the adjoining marginal portion of the strip 1 at the printing station. The printing apparatus is intended to make prints from negatives on film strips of a given width which are provided with a single row or with two rows of perforations. The masking section 18 is provided with elongated slots 18a, 18b movable along fixed guide pins or posts 19, 20 in directions at right angles to the direction of travel of the film strip 1. The masking section 42 is guided by and can move with reference to the section 18. Pins or like locking members are provided to fix the section 42 in selected position with reference to the section 18. Such pins may extend through registering holes of the sections 18, 42. The arrangement is such that the section 42 can be moved away from the section 18 even if it is fixed thereto for movement transversely of the posts 19, 20.

The section 18 of the third masking member carries a vertical pin 21 which extends into a slot 22a provided in a plate 22. The slot 22a makes an angle of 45° with the longitudinal direction of the strip 1 and the plate 22 has a sleeve which is slidable along a horizontal guide rod 23. A vertical follower pin 24 on the plate 22 extends into a centrally located third circumferential groove 9c of the adjusting cam 9. The parts 21-24 together constitute a follower assembly which serves to adjust the third masking member 18, 42 in synchronism with masking members 5, 6 in response to rotation of the cam 9. The width of the groove 9c is such that the follower pin 24 is received therein without any appreciable play in the axial direction of the cam.

A previewing device is provided upstream of the printing station to permit observation of one or more frames 2 located immediately behind that frame 2 which occupies the printing station. The previewing device which is shown in FIG. 1 is dimensioned to permit simultaneous observation of three successive film frames 2 of maximum length. Since the masking member 5 consists of thin sheet material, it does not interfere with visual observation of that frame 2 which is about to enter the printing station, i.e., the space between the masking members 5 and 6. The space above the film frames which are about to enter the printing station is unobstructed so that such frames can be viewed from above.

The previewing device comprises a substantially wedgelike hollow reflector 25 which is normally coupled to and is movable with the masking member 5 in the longitudinal direction of the strip 1. The reflector 25 is open at the top and at its larger (left-hand) end which latter is adjacent to a condenser lens 28 extending across the path of light issuing from a fixed light source 26 located in front of a reflector 27. A light-diffusing frosted pane 25a overlies the open upper side of the reflector 25 at a level closely below the path for the film strip 1 to transmit diffused light against the undersides of three frames 2 located behind the masking member 5. The frames 2 can actually slide along the upper side of the pane 25a. That edge portion of the reflector 25 which is located below the marginal portion 5a of the masking member 5 is rounded and serves as a means for preventing appreciable flexing of the strip 1 in downward direction. An idler roller or the like (not shown) is preferably provided below the marginal portion 6a to prevent downward flexing of the strip 1 at the discharge end of the printing station.

As stated before, the parts 26-28 of the previewing device can be fixedly mounted in the housing of the printing apparatus. The means for transmitting motion to the reflector 25 comprises a fork 30 on the reflector and an arm 29 on the masking member 5. When the masking member 5 moves lengthwise of the guide rod 8, the arm 29 moves the reflector 25 in the same direction and through the same distance.

The aforementioned carrier structure 50 supports the motor 12, transmission 13, shaft 11, cam 9, guide rods 7, 8, 23, masking members 5, 6, 18-42, and the masking element 41 and is pivotable on a pin 31 which is parallel to the direction of film travel and is preferably located in the plane of the strip 1. When the carrier structure 50 is tilted in a counterclockwise direction, as viewed in FIG. 1, the arm 29 moves upwardly and leaves the space between the prongs of the fork 30. The carrier structure 50 is tilted to move the masking members 5, 6 away from the film path in order to facilitate cleaning of the apparatus.

FIG. 3 shows the electric control circuit for the motor 12. The center of the annular contact 16 is located on the axis of the shaft 11 which latter rotates the movable contact 14. The contacts 17a-17e form a second annulus around the contact 16. The contact 16 is connected with the negative pole of the energy source by way of the motor 12. The positive pole of the energy source is connected with each of the contacts 17a-17e by way of the normally closed switches 33, 34, 35, 43, 32. A second set of normally open parallel-connected switches 36-39, 44 is connected between the positive pole of the energy source and the switches 32-35, 43. The switches 36, 37, 38, 39, 44 are respectively coupled to switches 32, 33, 34, 35, 43 in such a way that one of the thus coupled switches is open when the other switch is closed and vice versa. Pushbuttons (not shown) or analogous actuating devices are provided to move the switches 36-39, 44 between open and closed positions. For example, when the operator actuates a pushbutton to close the switch 36, the switch 32 opens automatically and disconnects the contact 17e from the positive pole of the energy source. The pushbuttons are preferably mounted on a control panel which is provided with symbols or other information pointing out the size of the light-transmitting window at the printing station in different positions of the masking member 5, 6 and 18-42. Depression of each pushbutton corresponds to a different position of such masking members.

The operation:

When the apparatus is started, the masking members 5, 6 and 18-42 assume positions which correspond to the format of frames 2 on the last strip 1 which has been copied during travel of its frames past the printing station. If it is desired to change the size of the light-transmitting window, the operator depresses one of the aforementioned pushbuttons whereby the previously depressed pushbutton automatically returns to inoperative position. For example, the operator may decide to depress the pushbutton which closes the switch 38 and thereby opens the switch 34 to disconnect the contact 17b from the positive pole of the energy source. The switch 38 connects the positive pole with the contacts 17a and 17c-17e because the switches 32, 33, 35 and 43 remain closed. The movable contact 14 engages the contact 16 and the contact 17c which latter is connected with the positive pole of the energy source. Thus, the motor 12 begins to rotate the shaft 11 and the movable contact 14 until the latter engages the rear end portion of the contact 17b, i.e., that portion which is the first to be engaged by the contact 14 if the latter rotates in a clockwise direction, as viewed in FIG. 3. The transmission 13 drives the adjusting cam 9 and adjusts the masking members 5, 6 and 18-42 until the motor 12 comes to a halt in response to advance of the contact 14 beyond the contact 17a. The apparatus preferably comprises a suitable brake (not shown) which automatically arrests the motor 12 as soon as the latter is disconnected from the positive pole of the energy source. This insures that the masking members come to a halt in accurately determined positions in which they define a light-transmitting window of optimum size for a particular size of frames 2. The arm 29 of the masking member 5 automatically adjusts the position of the reflector 25 so that the latter directs diffused light against the undersides of three frames 2 upstream of the printing station. The source of printing light is preferably located at a level below the printing station and the transporting mechanism for printing paper is then located at a level about the masks 5 and 6. It will be seen that the reflector 25 in no way interferes with passage of printing light through that frame 2 which is located in the space between the masking members 5 and 6.

The main function of switches 36-39 and 44 is to prevent continuous operation of the motor 12. These switches can be omitted if the control circuit is provided with other suitable means for insuring that one of the switches 32–35 and 43 is open at all times.

The shaft 11 and/or the cam 9 may further serve as a means for adjusting the transporting mechanism for printing paper, the exposure control and/or the rate of enlargement as a function of adjustment of masking members 5, 6 and 18–42. This reduces the time necessary to set up the printing apparatus for reproduction of images from different types of film strips.

Without further analysis, the foregoing will so fully reveal the gist of the present invention that others can, by applying current knowledge, readily adapt it for various applications without omitting features which fairly constitute essential characteristics of the generic and specific aspects of my contribution to the art. What is claimed as new and desired to be protected by Letters Patent is set forth in the appended claims.

I claim:

1. In an apparatus for reproducing images of exposed frames on strips of photographic film wherein successive frames are moved to and beyond a printing station, a combination comprising guide means defining an elongated path for lengthwise movement of film strips; masking means provided at said printing station and defining a window of variable size for the passage of printing light, said masking means comprising a pair of masking members extending transversely of said path and movable with reference to each other in the longitudinal direction of said path to and from predetermined starting positions; and adjusting means for moving said masking members, said adjusting means comprising rotary cam means having a pair of circumferentially extending cam faces and follower means provided on said masking members and each arranged to track a different cam face of said rotary cam means, said cam means being arranged to return said masking members to said starting positions after each revolution through 360°.

2. In an apparatus for reproducing images of exposed frames on strips of photographic film wherein successive frames are moved to and beyond a printing station, a combination comprising guide means defining an elongated path for lengthwise movement of film strips; masking means provided at said printing station and defining a window of variable size for the passage of printing light, said masking means comprising three masking members two of which extend transversely of said path and are movable with reference to each other in the longitudinal direction of said path and the third of which extends lengthwise of said path and is movable transversely of said path; and adjusting means for moving said masking members, said adjusting means comprising a single rotary cam for controlling the positions of said first, second and third masking members.

3. A combination as defined in claim 2, wherein said rotary cam has a discrete circumferentially extending cam face for each of said masking members and further comprising follower means provided on said masking members and arranged to track the respective cam faces.

4. In an apparatus for reproducing images of exposed frames on strips of photographic film wherein successive frames are moved to and beyond a printing station, a combination comprising guide means defining an elongated path for lengthwise movement of film strips; masking means provided at said printing station and defining a window of variable size for the passage of printing light, said masking means comprising a pair of masking members extending transversely of said path and movable with reference to each other in the longitudinal direction of said path, each of said masking members comprising a main portion located in a plane which is substantially normal to the plane of a film strip in said path and a marginal portion adjacent to said path, said marginal portions having rounded edges and being inclined toward each other so that each thereof makes an obtuse angle with the corresponding main portion; and adjusting means for moving said masking members.

5. A combination as defined in claim 1, wherein said adjusting means further comprises motor means for rotating said cam means to a plurality of angular positions each of which corresponds to different positions of said masking members with reference to each other.

6. A combination as defined in claim 1, further comprising means for indicating the positions of said masking members.

7. In an apparatus for reproducing images of exposed frames on strips of photographic film wherein successive frames are moved to and beyond a printing station, a combination comprising guide means defining an elongated path for lengthwise movement of film strips; masking means provided at said printing station and defining a window of variable size for the passage of printing light, said masking means comprising a pair of masking members extending transversely of said path and movable with reference to each other in the longitudinal direction of said path; adjusting means for moving said masking members, comprising a rotary cam, follower means provided on said masking members and arranged to track said cam, and motor means for rotating said cam to a plurality of angular positions each of which corresponds to different positions of said masking members with reference to each other, said motor means comprising an electric motor and a control circuit for said motor, said circuit comprising an annular first contact connected with one pole of an energy source, an annulus of second contacts concentric with said first contact and each connectable with the other pole of the energy source, a rotary contact engaging said first contact and arranged to engage successive second contacts in response to rotation of said motor, said rotary contact being in series with said motor, and means for connecting selected second contacts with said other pole so that said motor rotates said rotary contact and said cam until the rotary contact engages a second contact which is disconnected from the energy source.

8. A combination as defined in claim 4, wherein each of said second contacts has a rear portion as considered in the direction of rotation of said rotary contact and wherein each position of said masking members corresponds to one of those positions of said rotary contact in which the latter engages the rear portion of a second contact.

9. A combination as defined in claim 4, wherein the means for connecting selected second contacts with said energy source comprises a plurality of electric switches which are connected in parallel.

10. In an apparatus for reproducing images of exposed frames on strips of photographic film wherein successive frames are moved to and beyond a printing station, a combination comprising guide means defining an elongated path for lengthwise movement of film strips; masking means provided at said printing station and defining a window of variable size for the passage of printing light, said masking means comprising a pair of masking members extending transversely of said path and movable with reference to each other in the longitudinal direction of said path; adjusting means for moving said masking members; and previewing means arranged to illuminate at least one of the film frames which are located immediately behind the film frame at said printing station, said previewing means comprising a source of light and a light-confining portion movable with one of said masking members and arranged to direct light issuing from said source against said one film frame.

11. A combination as defined in claim 10, wherein said light source of said previewing means is a fixed light source and said previewing means further comprises a fixed condenser lens extending across the path of light issuing from said source, said light confining portion comprising a reflector which directs the light condensed by said lens against said one film frame.

12. A combination as defined in claim 11, wherein said reflector is provided with a light-diffusing pane arranged to transmit reflected light against said one frame.

13. In an apparatus for reproducing images of exposed frames on strips of photographic film wherein successive frames are moved to and beyond a printing station, a combination comprising guide means defining an elongated path for lengthwise movement of film strips; masking means provided at said printing station and defining a window of variable size for the passage of printing light, said masking means comprising a pair of masking members extending transversely of said path and movable with reference to each other in the longitudinal direction of said path; adjusting means for moving said masking members; and carrier means supporting said masking members for pivotal movement about an axis which is parallel to the longitudinal direction of said path.

14. A combination as defined in claim 1, wherein said masking members are located at a level above said path.

15. In an apparatus for reproducing images of exposed frames on strips of photographic film wherein successive frames are moved to and beyond a printing station, a combination comprising guide means defining an elongated path for lengthwise movement of film strips; masking means provided at said printing station and defining a window of variable size for the passage of printing light, said masking means comprising a pair of masking members extending transversely of said path and movable with reference to each other in the longitudinal direction of said path; adjusting means for moving said masking members; previewing means arranged to illuminate from below at least that film frame which is located immediately behind the film frame at said printing station, said previewing means including a portion which is movable lengthwise of said path; and motion-transmitting means separably coupling said movable portion of said previewing means to one of said masking members.

* * * * *